Figure 1:
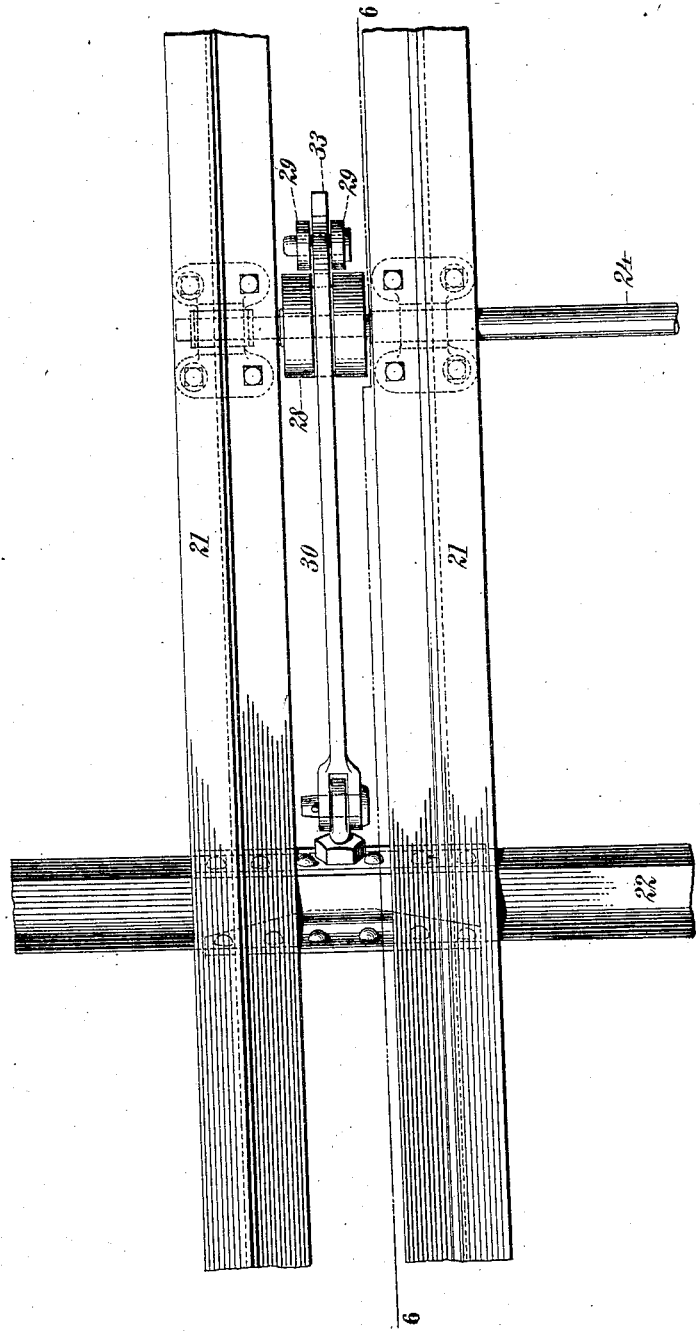

No. 814,660. PATENTED MAR. 13, 1906.
J. McE. AMES.
TRANSPORTATION CAR AND THE LIKE.
APPLICATION FILED APR. 12, 1905.

5 SHEETS—SHEET 1.

WITNESSES:

INVENTOR
John McE. Ames
BY
ATTORNEY

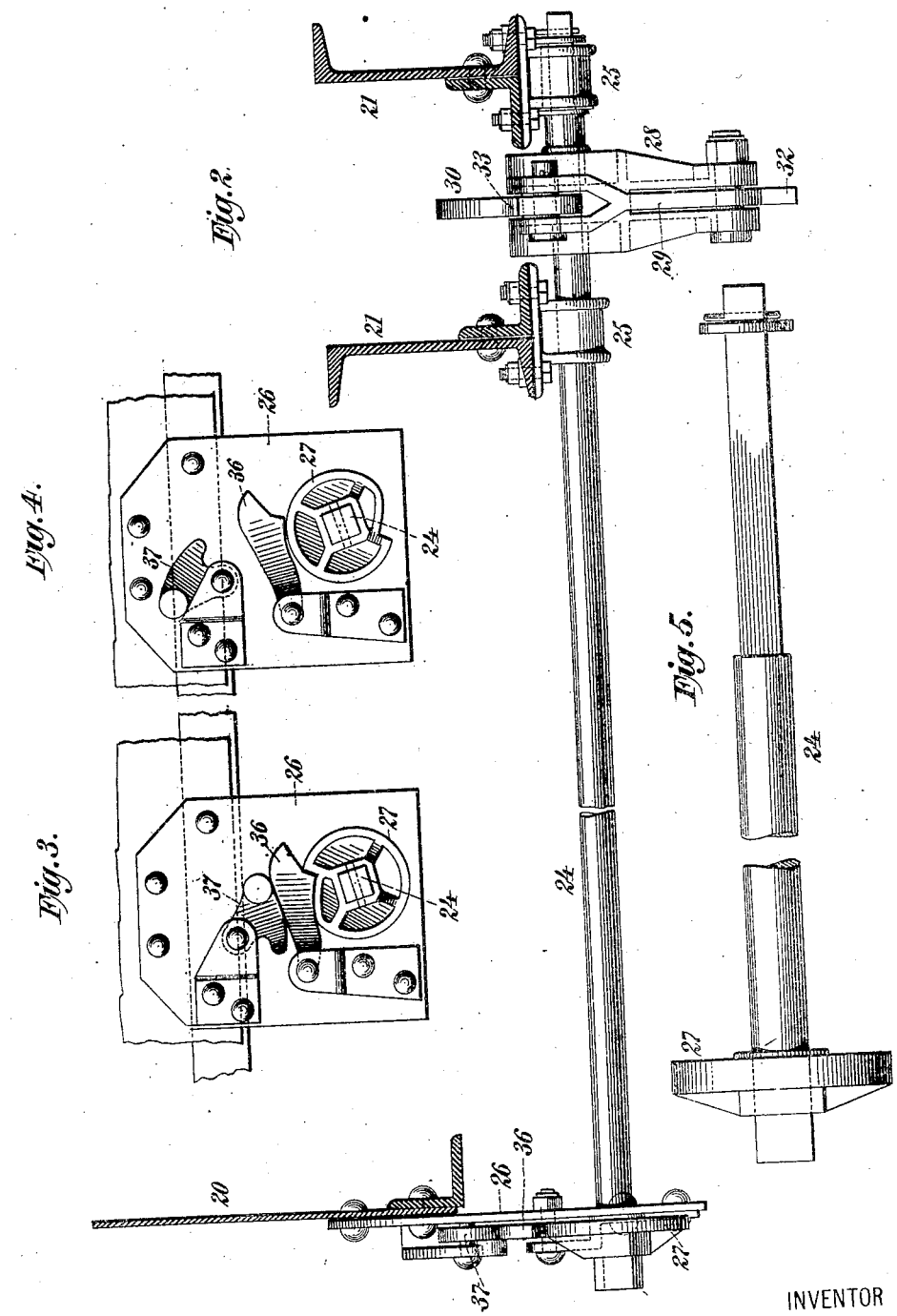

No. 814,660. PATENTED MAR. 13, 1906.
J. McE. AMES.
TRANSPORTATION CAR AND THE LIKE.
APPLICATION FILED APR 12, 1905.
5 SHEETS—SHEET 3.
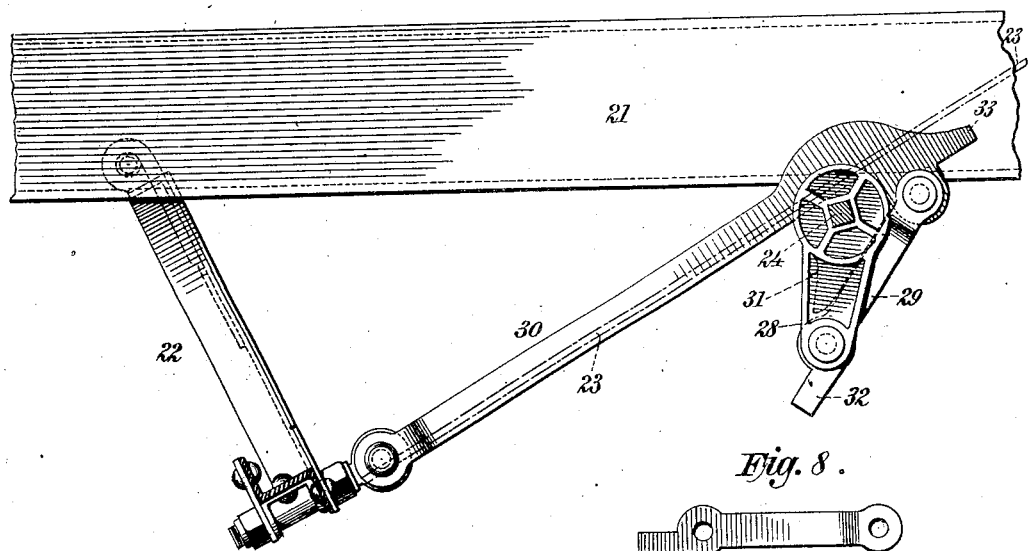
Fig. 6.
Fig. 8.
Fig. 7.
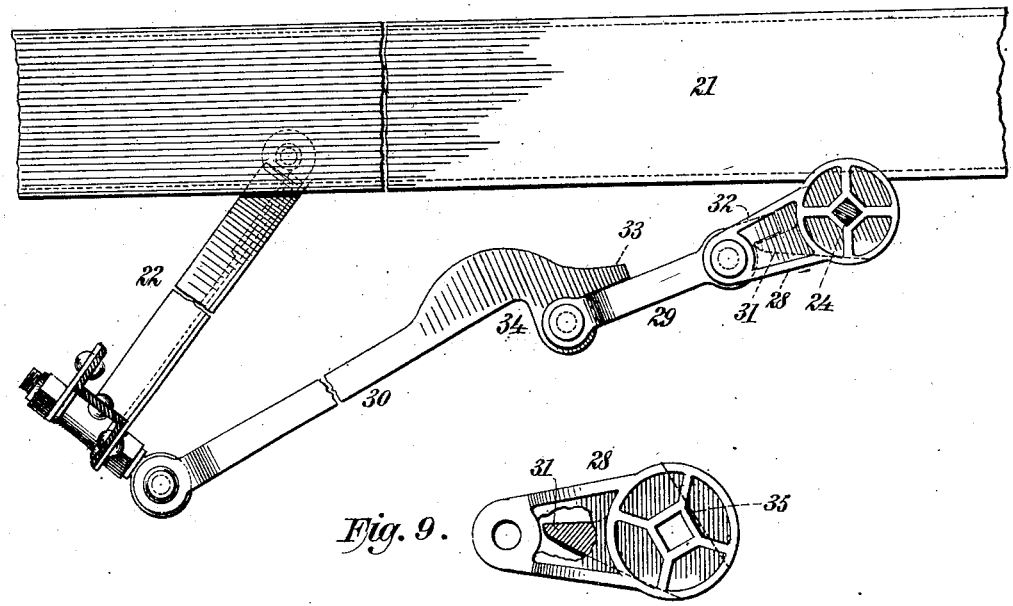
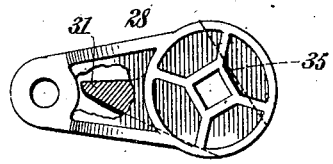
Fig. 9.
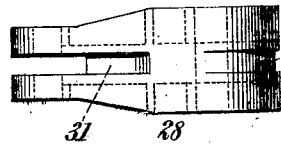
Fig. 10.
WITNESSES:
Gustave Dietrich
Edwin H. Dietrich
INVENTOR
John McE. Ames
BY Chas. C. Gill
ATTORNEY No. 814,660. PATENTED MAR. 13, 1906.
J. McE. AMES.
TRANSPORTATION CAR AND THE LIKE.
APPLICATION FILED APR. 12, 1905.
5 SHEETS—SHEET 4.
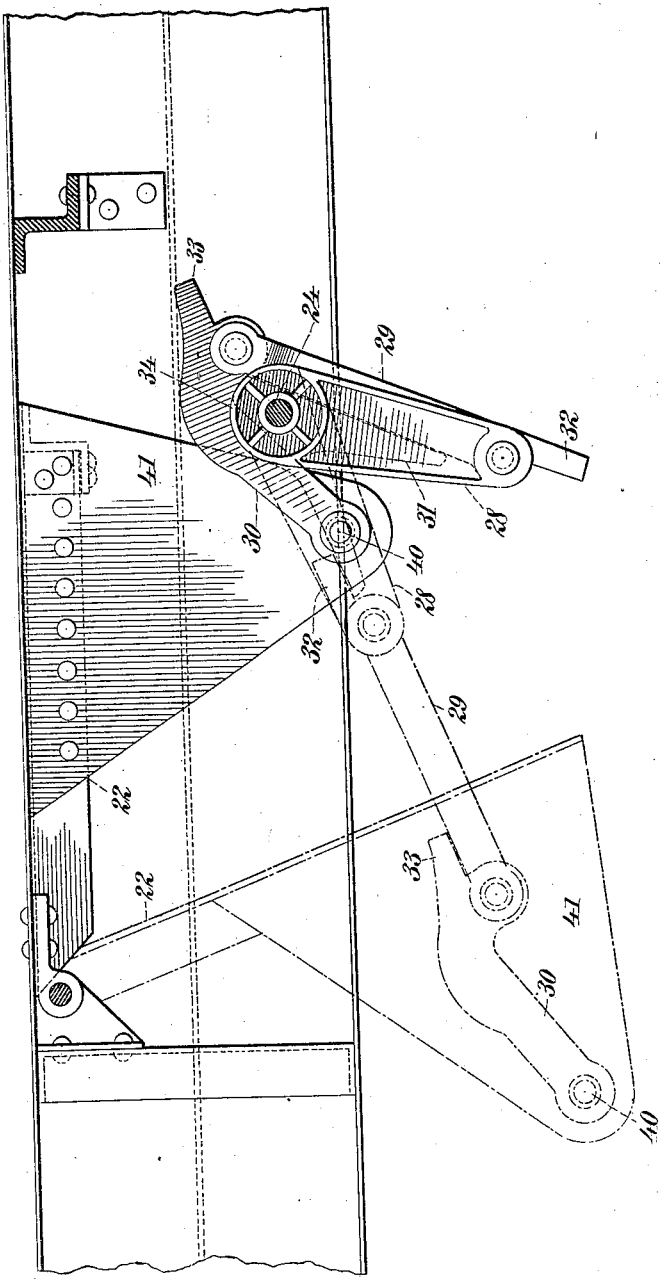
WITNESSES:
Gustave Dieterich.
Edwin W. Dieterich.
INVENTOR
John McE. Ames
BY
Chas. E. Gill
ATTORNEY

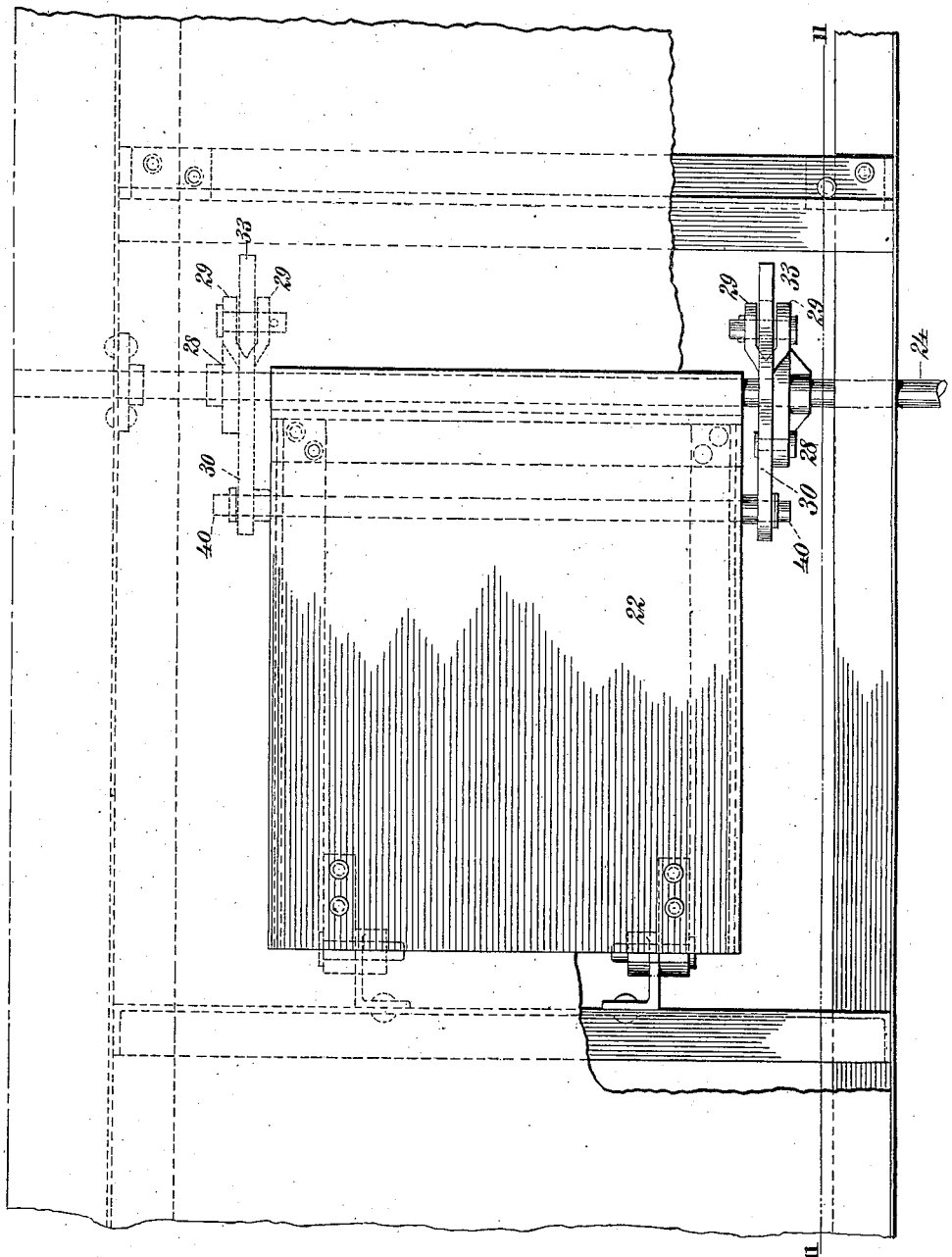

UNITED STATES PATENT OFFICE.

JOHN McE. AMES, OF NEW BRIGHTON, NEW YORK, ASSIGNOR TO BENJAMIN A. HEGEMAN, JR., OF NORTH PLAINFIELD, NEW JERSEY.

TRANSPORTATION-CAR AND THE LIKE.

No. 814,660.

Specification of Letters Patent.

Patented March 13, 1906.

Application filed April 12, 1905. Serial No. 255,095.

*To all whom it may concern:*

Be it known that I, JOHN McE. AMES, a citizen of the United States, and a resident of New Brighton, in the county of Richmond and State of New York, have invented certain new and useful Improvements in Transportation-Cars and the Like, of which the following is a specification.

The invention relates to improvements in transportation-cars and the like, and pertains more particularly to novel mechanism for opening, closing, and locking the discharge gate or gates located at the bottom of the car compartment or compartments.

My invention is applicable to gates or doors of both the hopper-bottom and flush-bottom types, and generally to cars or receptacles for the transportation or storage of materials and from which the materials are dumped or discharged through doorways in the bottom or lower end of same.

The invention will be fully understood from the detailed description hereinafter presented, reference being had to the accompanying drawings, in which—

Figure 1 is a top view of a portion of the center or draft sills of a hopper-car with gate-operating mechanism embodying my invention supported thereby, the Z-bar at the lower edge of the gate being the only part of the latter illustrated. Fig. 2 is a transverse section through a portion of a car having applied thereto gate-operating mechanism embodying my invention. Fig. 3 is a side elevation of a portion of the car and illustrates the ratchet-wheel, dog, and weight in their operative position for locking the gate-operating shaft. Fig. 4 is a like view of same, showing the inoperative position of said dog and weight. Fig. 5 is a detached side elevation, partly broken away, of the gate-operating shaft. Fig. 6 is a longitudinal section through a portion of the car on the dotted line 6 6 of Fig. 1 and illustrates the gate-operating mechanism as securing a hopper-car gate in closed position. Fig. 7 is a like view of same, showing the position of said mechanism when said gate is wide open. Fig. 8 is a detached side view of a link constituting a part of the gate-operating mechanism. Fig. 9 is a detached side elevation, partly broken away, of a crank-arm constituting a part of the gate-operating mechanism. Fig. 10 is an edge view of same. Fig. 11 is a longitudinal section through a portion of a flat-bottom car on the dotted line 11 11 of Fig. 12 and illustrates the application of the gate-operating mechanism to a flush-bottom gate, the latter being shown in its open position by dotted lines; and Fig. 12 is a top view, partly broken away, of same.

In the drawings, referring to Figs. 1 to 10, inclusive, 20 designates a portion of the side of a hopper-car of usual construction; 21, the draft or center sills of same; 22, a usual type of hinged discharge gate or door at the lower end of the customary inclined floor-section 23, (denoted by dotted lines in Fig. 6,) and 24 a transverse shaft from which through novel intermediate mechanism embodying my invention the gate or door may be operated. The shaft 24 extends part way across the car below the inclined floor-section 23 and is journaled at its inner end in hanger-bearings 25, secured to the center sills 21, Fig. 2, while at its outer end said shaft is mounted in a plate 26, at the outer side of which the said shaft has a polygonal end adapted to receive a wrench and is provided with a ratchet-wheel 27, hereinafter referred to. Upon the inner portion of the shaft 24, on a central vertical plane intermediate the sills 21, is rigidly secured a crank-arm 28, to which is pivotally connected one end of the link 29, whose other end is pivotally connected with a rod 30, which is pivotally connected with the usual gate or door 22, as shown in Figs. 6 and 7. The crank-arm 28 is bifurcated beyond its hub portion and between its members is formed with the solid web portion 31, which when the gate or door 22 is in an open position, as shown in Fig. 7, serves as a stop for the then upper end of the link 29, which is formed with a finger or arm 32 to pass between said members and engage said stop. The link 29 presents a single thickness at its end which is connected with the crank-arm 28 and passes between the members of the latter, and it is on this end of said link that the projecting finger or arm 32 is formed. The opposite end of the link 29 is bifurcated and receives between its members the upper end of the rod 30, which on said end is formed with a finger or arm 33, to, when the gate 22 is thrown open, engage the then upper edge of the link 29 and operate as a stop for preventing at such time the adjoining ends of said link and rod from folding downwardly. The purpose of the finger 32 on the link 29 and web 31 on the crank-arm 28 is likewise to prevent the folding downwardly of the adjoining ends of said link and arm when the gate 22 is thrown open. The upper end of the rod 30, aside from the stop-finger 33, is of special formation, in that said end extends downwardly at substantially a right angle to the adjacent portion of the rod, thereby forming a bend 34, Fig. 7, in the rod and enabling the upper end of the latter to, upon the closing of the gate 22, lock around the upper side of the shaft and in part enter a recess 35, provided in the hub portion of the crank-arm 28 to receive the same, said rod when in such position, Fig. 6, having the pivot-point at its upper end below a center line through the pivot-point at the lower end of said rod and the operating-shaft 24 and effectually locking the gate in its closed position. The crank 28 and link 29 extend downwardly and incline toward the middle of the car when the gate is closed, the pivot connecting said crank and link during the closing of the gate passing around, below, and beyond a vertical line through the shaft 24, whereby the parts become more effectually locked in their closed position. When the gate 22 is in an open poposition, the crank-arm 28, link 29, and rod 30 will extend in a line from the shaft 24 to the gate, as shown in Fig. 7, said parts being prevented from folding downwardly by the stop fingers or arms 32 33, and when it is desired to close the gate the attendant will apply a wrench to the outer polygonal end of the shaft and give the latter a partial turn in a direction downwardly and toward the gate, this resulting in the crank-arm 28 turning toward the gate and upwardly and by winding the link 29 around the shaft 24 drawing the gate to its closed position and the rod 30 upwardly until the bent upper end of the latter locks around said shaft, as shown in Fig. 6. To open the gate 22, the attendant will apply a wrench to the shaft 24 and give the same a reverse turn or upwardly and toward the gate, and thereby through the crank-arm 28 and link 29 raise the upper end of the rod 30 from its locking position, whereupon the weight of the gate and the load on it will drive the gate to its open position. (Shown in Fig. 7.) The arrangement of the arm 28, link 29, and rod 30 affords operating and self-locking means; but preferably the car will be provided with additional means for locking the gate in its closed position, and these means in the present instance comprise, Figs. 2, 3, and 4, the ratchet-wheel 27, pivoted dog 36, and pivoted weight 37. The ratchet-wheel 27 is provided with a recess into which the detent of the dog 36 will fall when the gate is closed, and the dog will be locked in this engaging position by the weight 37, as shown in Fig. 3. When it is desired to open the gate, the weight 37 will be turned upwardly free of the dog 36, as shown in Fig. 4, and thereupon the shaft 24 will be turned, as above described, to lift the upper end of the rod 30 from its locking position, the dog 36 at this time raising automatically from the single recess of the ratchet-wheel 27, due to the force exerted by the load against the gate, and riding on the periphery of said wheel.

In Figs. 11 and 12 I illustrate my invention as applied to a flush-bottom gate or door, and since I do not in such application materially modify the gate-operating mechanism shown in Figs. 1 to 10, inclusive, further than to vary the proportions of the parts thereof to adapt tnem to the changed condition of gate, I do not deem it necessary to enter into any special description of the parts as applied to a flush-bottom gate or door, but in the drawings number said parts correspondingly with the like parts shown in Figs. 1 to 10, inclusive. It is to be observed, however, that for flush-bottom gates I duplicate the crank-arm 28, link 29, and rod 30 at the edges of the gate and swivel the lower ends of the rods 30 upon the projecting ends of a transverse rod 40, carried by side plates 41, connected with the gate.

What I claim as my invention, and desire to secure by Letters Patent, is—

1. In a car or the like having a discharge-gate at its bottom, the gate mechanism comprising the transverse operating-shaft, the crank-arm thereon having members between which is formed a web or stop, the link having one end pivotally secured between said members and provided with a finger to engage said stop, and the rod pivotally connected at one end with the gate and at its other end between the members of the bifurcated other end of said link, this end of said rod having a stop-finger to engage the upper edge of said link when the gate is opened and also a bend to lock around said shaft when tne gate is closed; substantially as set forth.

2. In a car or the like having a discharge-gate, at its bottom, the gate mechanism comprising the transverse operating-shaft, the crank-arm thereon, the link pivotally connected therewith and the rod pivotally connected with said link and said gate and having a bend at its upper end to lock around said shaft when the gate is closed, combined with the ratchet-wheel on said shaft, the dog to engage the same, and the weight for locking said dog in engagement with said wheel; substantially as set forth.

3. In a car or the like having a discharge-gate, at its bottom, the gate mechanism comprising the transverse operating-shaft, the crank-arm thereon, the link pivotally connected therewith and the rod pivotally connected with said link and said gate and having a bend at its upper end to lock around said shaft when the gate is closed, combined with the ratchet-wheel on said shaft and having a single recess, the pivoted dog having a detent to enter said recess and automatically leave the same under the weight of the load on the gate when the latter is otherwise released to open, and the pivoted weight for locking said dog in fixed engagement with said ratchet-wheel; substantially as set forth.

4. In a car having a discharge-gate at its bottom, the gate mechanism comprising the transverse operating-shaft, the crank-arm thereon, the link pivotally connected therewith, and the rod pivotally connected with said link and gate and at its upper end being extended downwardly at an angle, thereby forming a bend in said rod enabling the latter to, upon the closing of the gate, lock around the upper side of said shaft, said link being pivoted to the lower end of the upper angular portion of said rod at a point below a center line through the pivot-point at the lower end of said rod and said operating-shaft, for automatically locking the gate in closed position; substantially as set forth.

Signed at New York city, in the county of New York and State of New York, this 10th day of April, A. D. 1905.

JOHN McE. AMES.

Witnesses:
B. A. HEGEMAN, Jr.,
CHARLES C. GILL.